Dec. 26, 1967  D. H. RIESLAND  3,360,687
LAMP BALLAST
Filed Sept. 28, 1965  3 Sheets-Sheet 2
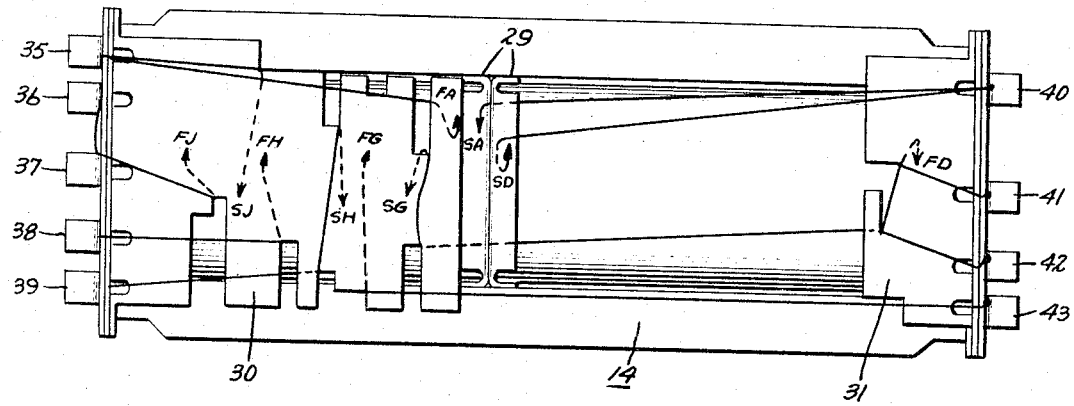
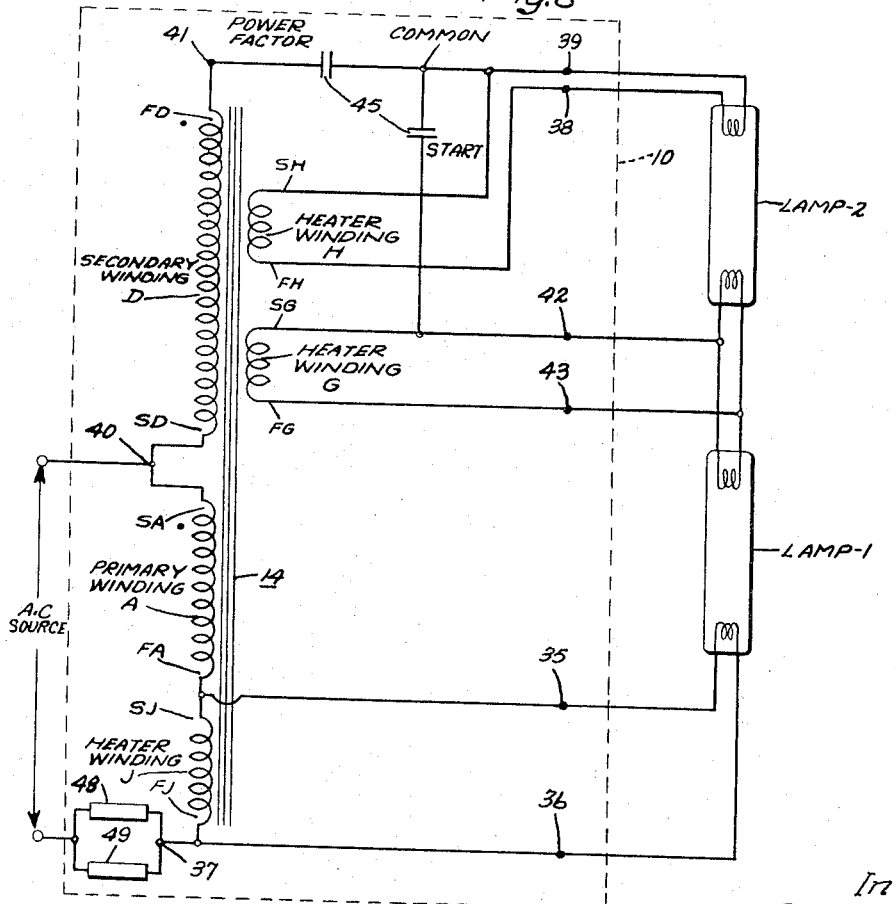
Inventor:
David H. Riesland,
by James G. Williams
Attorney.

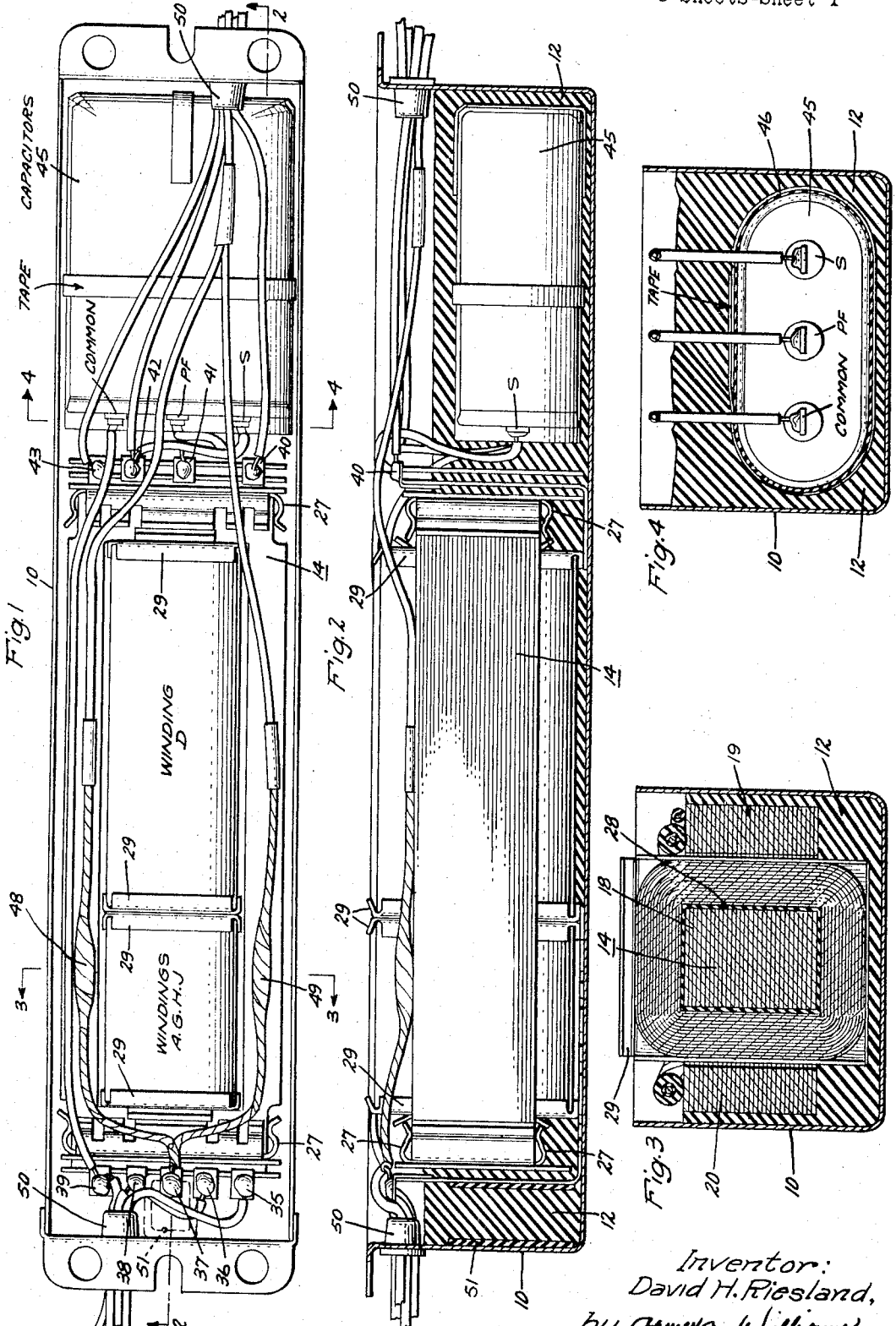

Dec. 26, 1967  D. H. RIESLAND  3,360,687
LAMP BALLAST

Filed Sept. 28, 1965  3 Sheets-Sheet 3

Inventor:
David H. Riesland,
by James G. Williams
Attorney.

United States Patent Office 3,360,687
Patented Dec. 26, 1967

3,360,687
LAMP BALLAST
David H. Riesland, Danville, Ill., assignor to General Electric Company, a New York corporation
Filed Sept. 28, 1965, Ser. No. 490,889
9 Claims. (Cl. 317—99)

The invention relates to an electric discharge lamp ballast, and particularly to an improved fluorescent lamp ballast that has a longer life than previously known ballasts even under higher ambient temperature conditions.

One factor that reduces the life of a fluorescent lamp ballast as much as or more than any other single factor is heat. If more heat, relatively speaking, is removed from a ballast, then the ballast and its components will be cooler, relatively speaking, and will have a longer life. However, the amount of heat that can be removed from a ballast depends, in part, on the temperature of the air around the ballast and its fluorescent lamp and fixture. This temperature of the air is sometimes called the ambient temperature. If the ambient temperature of the air around a fluorescent lamp ballast is relatively high, then only a relatively small amount of heat can be removed from the ballast. In many locations, such as factories and shops, the ambient temperature is relatively high, such as in the order of 50 degrees centigrade (C.). Under such an ambient temperature, the internal temperatures of the ballast may be in the order of 85 degrees C. When fluorescent lamps are used in such locations, the ballasts must operate under the existing conditions. Generally, previous ballasts were not designed for such relatively high ambient temperature conditions, and hence had a relatively short life.

Accordingly, an object of the invention is to provide an improved fluorescent lamp ballast for operating under relatively high ambient temperature conditions.

Another object of the invention is to provide, for a given load condition and ambient temperature, a fluorescent lamp ballast that has a longer life than existing fluorescent lamp ballasts designed for a comparable load condition and ambient temperature.

Another object of the invention is to provide an improved fluorescent lamp ballast that has a relatively long life in relatively high ambient temperatures.

Since the amount of heat that can be removed from a ballast depends, in part, on the ambient temperature, and since the ambient temperature may be relatively high, the ballast should be designed to operate at an inherently cooler temperature to provide longer life. And from the standpoint of manufacturing and economy, it may be preferable that the ballast be constructed of materials having conventional or low heat characteristics or classes rather than of materials having high heat characteristics or classes.

Accordingly, another object of the invention is to provide a ballast that is constructed of conventional heat class materials and that operates at an inherently cooler temperature for a given load than previously known ballasts designed for the same load.

Another object of the invention is to provide an improved ballast that operates at an inherently cooler temperature for a given load and ambient temperature than previously known ballasts designed for the same load but for a cooler ambient temperature.

Briefly, these and other objects are achieved in accordance with the invention by an improved ballast having an elongated, shell-type magnetic core. The core comprises a center leg and first and second outer legs that form first and second winding openings between the center leg and the outer legs. The secondary winding of the ballast is wound transversely around a portion of the center leg and is located in the winding openings. The secondary winding is dimensioned so that its total length along the center leg is approximately 1.6 times its larger transverse dimension and 2.0 times its smaller transverse dimension. A primary winding having transverse dimensions at least as small as the secondary winding is wound transversely around another portion of the center leg. Both the primary and secondary windings are designed so that they have respective current densities of approximately 1,000 amperes per square inch. Heater windings may also be provided, and are preferably wound around the primary winding. The ballast core and windings are suitably insulated and mounted in a housing. A ballasting and power factor correcting capacitor and/or a starting capacitor, preferably in a single insulated case, may also be mounted in the housing. After the windings and capacitors are connected and leads brought out of the housing, a filler may be added and the housing closed or sealed to provide a completed ballast.

The invention is particularly pointed out in the claims. The invention may be better understood from the following description given in connection with the accompanying drawings in which:

FIGURE 1 shows a top plan view of a preferred embodiment of the improved ballast of the invention;

FIGURE 2 shows an elevation view of the improved ballast in a longitudinal section taken along the lines 2—2 in FIGURE 1;

Figure 7:
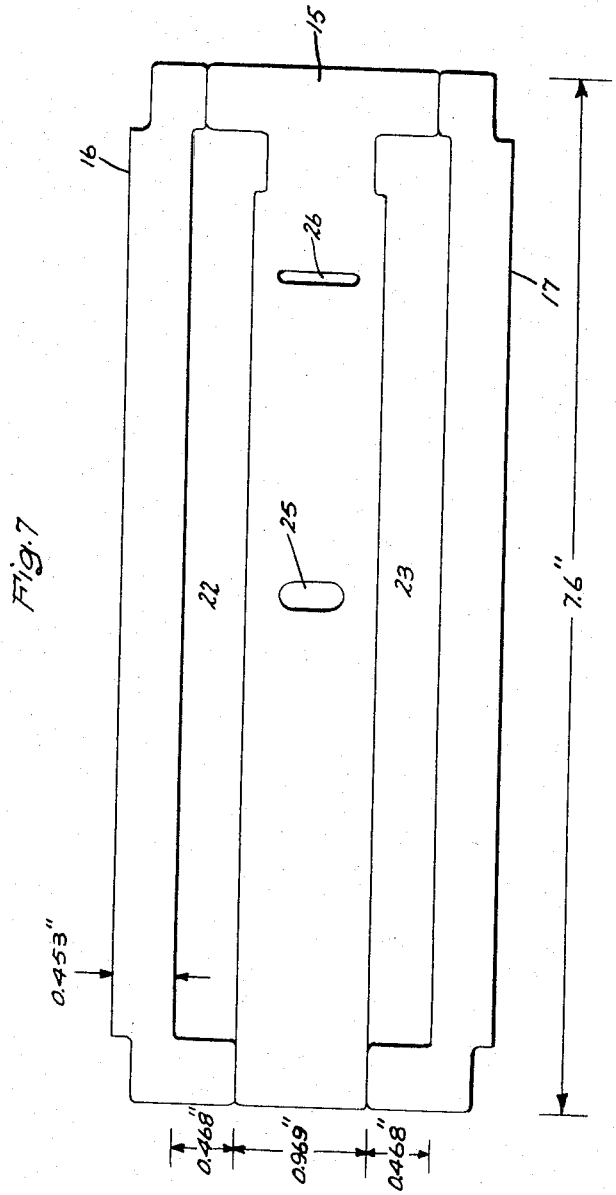

FIGURES 3 and 4 show elevation views of the improved ballast in transverse sections taken along the lines 3—3 and 4—4 respectively in FIGURE 1;

FIGURE 5 shows a bottom plan view of the core and windings of the improved ballast;

FIGURE 6 shows a schematic diagram of the improved ballast of FIGURES 1–5 connected to a pair of fluorescent lamps; and FIGURE 7 shows one layer of laminations used in the core of the improved ballast.

As shown in FIGURES 1–4, the improved ballast of the invention is contained in a suitable metallic case or housing 10. In the assembly of such a ballast, a suitable filler 12, such as an asphalt compound that is electrically insulating and heat conducting, is poured in the case 10. The ballast components are then placed on top of the filler 12. After various connections to the ballast components are made and leads are brought out of the case 10, more filler 12 is added to fill the case 10 and completely surround the ballast components. In the figures, the filler 12 has been shown only partially filling the case 10 so that various components and leads can be seen more clearly. When the filler 12 hardens, the ballast components are firmly held in the case 10. A suitable metallic cover is placed on top of the case 10 to form a completed assembly.

The ballast comprises a shell-type core 14 preferably made of a plurality of layers of laminations. Each layer has three punchings 15, 16, 17 of magnetic material having the configuration and arrangement shown in FIGURE 7. The layers of punchings 15 form a center of an inner leg 18 of the core 14. The layers of punchings 16, 17 form outer legs 19, 20 respectively of the core 14. When the layers are stacked up, winding openings or windows 22, 23 are formed between the inner leg 18 of the core 14 and the outer legs 19, 20 of the core 14. The punchings 15 which form the inner leg 18 of the core 14 are provided with two transverse slots or holes 25, 26. These holes 25, 26 are located in the portion of the inner leg 18 of the core 14 about which the secondary winding of the ballast is positioned so as to provide magnetic reluctance. This magnetic reluctance provides the desired reactance which, with the reactance of a ballasting and power factor capacitor, controls the lamp current. When the stacked punchings 15, 16, 17 are assembled with the windings, the completed assembly forms a shell-type core that is held together by end clamps 27.

The preferred embodiment of the ballast of the invention being described includes a primary winding A, a secondary winding D, and three heater windings G, H, and J. The primary and secondary windings A and D are respectively wound about arbors and then placed on suitable rectangular spools 28 (shown in FIGURE 3) of insulating material such as a cyanoetholated kraft paper. These spools 28 are formed by winding several layers of the insulating material on an arbor, and are dimensioned to fit over the formed inner leg 18 of the core 14. The three heater windings G, H, and J are wound on the outside of the primary winding A. The spool 28 and its secondary winding D and the spool 28 and its primary and heater windings A, G, H, J are placed or slid over the formed inner leg 18 of the core 14. Suitable pieces of insulation 29, such as a cyanoetholated kraft paper having rectangular openings conforming with the inner leg 18 of the core 14, may be provided at each end of the windings.

FIGURE 5 shows a bottom plan view of the core 14 and particularly shows the start and finish locations of the various windings. In FIGURE 5 (and also in FIGURE 6), the start location of each winding is indicated by the letter S followed by the winding designation letter, and the finish location of each winding is indicated by the letter F followed by the designation letter. For example, the start location of the heater winding J is indicated by the letters SJ, and the finish location of the heater winding J is indicated by the letters FJ. The leads or ends of the various heater windings G, H, and J are located and held by notches in suitable flat insulation 30 such as a cyanoetholated kraft paper. Likewise, one end of the heater winding G and one end of the secondary winding D are located and held by notches in suitable flat insulation 31 such as a cyanoetholated kraft paper.

A number of terminals are held in position at each end of the assembled core 14 and the windings by suitable insulation such as a cyanoetholated kraft paper. This insulation may be an extension of the insulation 30, 31 which is bent around the ends of the assembly. At the left end of the assembly as viewed in FIGURE 5, a terminal 35 is connected to the start of the heater winding J and to the finish of the primary winding A. Two terminals 36, 37 are connected together and are connected to the finish of the heater winding J. A terminal 38 is connected to the finish of the heater winding H. A terminal 39 is connected to the start of the heater winding H. At the right end of the assembly as viewed in FIGURE 5, a terminal 40 is connected to the start of the primary winding A and to the start of the secondary winding D. A terminal 41 is connected to the finish of the secondary winding D. A terminal 42 is connected to the start of the heater winding G. And, a terminal 43 is connected to the finish of the heater winding G. These same terminals 35–43 are also indicated in FIGURE 1. The terminal numbers on the left and right sides of FIGURE 1 are reversed from top to bottom with respect to the terminal numbers on the left and right sides of FIGURE 5. This is because FIGURE 5 shows a bottom view of the core 14 and its windings while FIGURE 1 shows a top view of the core 14 and its windings.

Since a ballast may require a starting capacitor for sequentially starting a plurality of fluorescent lamps, and may also require a ballasting and/or power factor capacitor to reduce the lagging power factor as resulting from the ballast inductance, the case 10 is preferably made large enough to accommodate the desired number of capacitors 45. These capacitors 45 are housed in a common case, and have a common terminal as indicated. In the embodiment shown, a ballasting capacitor that also provides power factor correction is used. This capacitor is terminated on a power factor terminal PF. A start capacitor is also provided, this capacitor being terminated on a start terminal S. The capacitors 45 are positioned in the case 10 with the capacitor terminals adjacent the terminals 40–43. The common capacitor terminal is connected to the terminal 39 at the left end of the ballast as viewed in FIGURE 1. The power factor capacitor terminal PF is connected to the terminal 41 at the right end of the ballast as viewed in FIGURE 1, and the start capacitor terminal S is connected to the terminal 42, also at the right end of the ballast as viewed in FIGURE 1. The case of the capacitors 45 may be covered with a suitable insulation 46 such as Mylar that is held in place by tape.

External leads are directly connected to terminals 35, 36, 38, 39, 40, 42, 43. An external connection to terminal 37 is also made over parallel paths through thermally operated protective devices 48, 49. These thermally operated protective devices are described in Patent No. 3,201,646 entitled, Ballast Apparatus Utilizing Temperature Responsive Fuses, granted to Walter C. Mansfield, Jr., on Aug. 17, 1965. These thermally operated protective devices 48, 49 contain a fusible link that opens the paths between the ballast terminals 36, 37 and their external connections if excessive heat develops in the ballast so as to protect the fluorescent lamp fixture and its surroundings.

FIGURE 6 shows a schematic diagram of the ballast and its connections shown in FIGURES 1–5. The comparable electrical elements shown schematically in FIGURE 6 have the same reference numerals as their corresponding actual elements shown in FIGURES 1–5. The case 10 is indicated by the dashed line 10 in FIGURE 6. The two thermally operated protective devices 48, 49 are connected to one side of an alternating current source, and the terminal 40 is connected to the other side of an alternating current source. Typically, this alternating current source may be conventional 120 volt, 60 cycle power. The terminals 35, 36, 38, 39, 42, 43, are connected externally to a pair of fluorescent lamps 1 and 2 as indicated in FIGURE 6. The heater winding H provides heating power for one of the heaters of lamp 2. The heater winding G provides heating power for the other heater of lamp 2 and one of the heaters of lamp 1. And, the heater winding J provides heating power for the other heater of lamp 1. The primary winding A and the secondary winding D are coupled in typical autotransformer relation as indicated by the conventional polarity dots adjacent one end of each of these windings A and D. In accordance with this dot convention, a given polarity of voltage at the dotted end of one winding causes the dotted ends of the other windings to have the same given polarity of voltage. When power is applied to the primary winding A, the voltage across the primary winding A is added to the voltage across the secondary winding D, and these added voltages are applied across the lamp 1 through the start capacitor. After lamp 1 fires, this same starting voltage is applied across lamp 2 so that lamp 2 is also fired. When lamp 2 fires, its low voltage drop essentially short-circuits the start capacitor so that current serially flows through lamps 1 and 2 and the power factor and ballasting capacitor. The holes 25, 26 in the inner leg 18 of the core 14 provide a better lamp current waveform and cause a relatively larger amount of capacitive reactance to be coupled from the secondary circuit back to the primary circuit.

The ballast shown and described above has been actually built and has operated two 105 watt, 96 inch fluorescent lamps. The core 14 for this ballast was comprised of laminations of silicon steel having the shape and dimensions shown in FIGURE 7. These laminations had a thickness of 0.019 inch, and approximately 71 layers were used to form a core or stack height of 1.375 inches. Thus the inner leg 18 of the core 14 was 0.969 inch wide and 1.375 inches thick. The spools 28 were formed of several layers of cyanoethalated kraft paper having a total thickness of 0.020 inch. The spools 28 were 0.008 inch oversize relative to the width and thickness of the inner leg 18. The secondary winding D and the primary winding A are precision wound. That is, each layer in the windings has closely spaced turns that fit in the grooves formed by the previously wound layer. The secondary winding D comprised 1600 turns of No. 20 copper wire with Formex insulation. The No. 20 wire was designed to carry a secondary current of 800 milliamperes, which is equivalent to a current density of 996 amperes per square inch. The secondary winding D had a length of 4.0 inches along the longitudinal axis of the inner leg 18 and the core 14. Suitable insulation, such as a cyanoetholated kraft paper, was wrapped around the secondary winding D. The secondary winding D, with its insulation, had a clearance of 0.008 inch from the outer legs 19, 20 so that its total transverse width was approximately 1.9 inches. Its transverse height was approximately 2.3 inches.

The primary winding A was wound on a spool 28 similar to the spool 28 for the secondary winding D. The primary winding A comprised 360 turns of No. 17 copper wire with Formex insulation. The No. 17 wire was designed to carry a primary current of 1600 milliamperes, which is equivalent to a current density of 993 amperes per square inch. The primary winding A had a length of 2.5 inches along the longitudinal axis of the inner leg 18 of the core 14.

The weight of copper used in the primary and secondary windings was approximately 3.76 pounds. The weight of iron in the core 14 was approximately 5.38 pounds. These weights provided a copper to iron ratio of approximately 0.7.

Suitable insulation, such as a layer of a cyanoetholated kraft paper was wrapped around the primary winding A, and the heater windings G, H, J were wrapped around the insulated primary winding A. The heater windings G, H, J respectively comprised 12 turns, in a single layer, of No. 21 copper wire with nylon insulation. Suitable insulation, such as a cyanoetholated kraft paper, was wrapped around the heater windings G, H, J. The assembled primary and heater windings A, G, H, J, had substantially the same shape and size of transverse perimeter as the secondary winding D.

The capacitors 45 were wound of aluminum foil and kraft paper, and filled with Pyranol. The capacitors had a voltage rating of 540 volts. The ballasting and power factor capacitor had a nominal size of 4.05 microfarads, and the starting capacitor had a nominal size of 0.075 microfarads. The capacitors 45 were housed in an aluminum can that was 1.5 inches thick, 2.75 inches wide, and 3.5 inches long.

The assembled core and coil and the cyanoetholated kraft paper were vacuum impregnated with the equivalent of a class B varnish for better and longer lasting insulation. The various connections and external leads for the assembly used seven strands of copper wire equivalent to No. 18 wire with 600 v., 125° C., Vulkene insulation. These leads were brought out of the case 10 through nylon grommets 50. The ballast assembly and capacitors were housed in a case 10 that was approximately 3 inches wide, 2.5 inches deep, and 13.5 inches long. A cyanoetholated kraft paper spacer 51 was provided at the end near the terminals 35–39 to insure that these terminals 35–39 did not touch the case 10. The filler 12 was a mixture of asphalt and silica poured in the case 10 around the components.

Ten core and coil ballast units constructed as described above have been thermally aged in ovens having a temperature that produced an internal temperature of 125° C. The units were removed from the aging ovens periodically to test for switching transients, high potential, and lamp operation. After .85 year of such thermal aging, none of the ten core and coil units had failed. The median life expectancy of such units can be estimated by the following formula:

$$\text{Life expectancy} = \text{actual life} \times 2^{N/10}$$

In this formula, N is the number of degrees C. of the internal temperature of the unit above a normal internal temperature of the unit. In an industrial environment having a normal ambient temperature of 50 degrees C., a typical internal temperature of this unit in such an industrial environment is 85 degrees C. Thus, for the test mentioned above in which the internal unit temperatures were maintained at 125 degrees C., N is equal to 40. Therefore, the median life expectancy can be estimated to be greatly in excess of $.85 \times 2^4$ or 13.6 years. This improved life expectancy at high ambient temperatures is a result of the improved ballast design described and shown above.

The improved life expectancy is a result of the novel ratios of secondary winding length to winding height, or to winding width, or to winding area. As mentioned, the secondary winding D was 4.0 inches long, 2.3 inches high, and 1.9 inches wide. This gives a ratio of length to height of 4/2.3 or 1.7, and a ratio of winding length to width of 4/1.9 or 2.1. If it is assumed that each corner of the secondary winding D, along a transverse plane relative to the longitudinal axis of the core 14 and the windings, is a 90 degree circular sector, the transverse winding area of the secondary winding D was approximately 2.6 square inches. With a winding length of 4.0 inches along the longitudinal axis, the length to area ratio was approximately 1.5. Thus, if a secondary winding length to height ratio of at least 1.5 is maintained, or that if a secondary winding length to width ratio of at least 1.9 is maintained, or that if a secondary winding length to area ratio of at least 1.3 is maintained, then improved ballast operation and life, at ambient temperatures as high as 50 degrees C., will be obtained. Expressed in another way, the width of each of the winding openings should be substantially one half of or less than one half of the width of the inner leg 18 of the core 14 and the secondary winding D should have a length that is at least eight times the winding opening width to insure an improved ballast in accordance with the invention. Also specifically, the improved life expectancy is a result of the low current densities in the primary and secondary windings. Thus, if the current densities in these windings are no more than 1100 amperes per square inch, then improved ballast operation and life, at ambient temperatures as high as 50 degrees C., will be obtained. Thus, it will be seen that the invention provides a new and improved ballast that is constructed of conventional materials with normal or average heat classes, but that has a relatively long life despite relatively adverse and high ambient temperatures.

It will thus be seen that the ballast described provides improved operation under relatively adverse and relatively high ambient temperatures. Although the ballast has been shown in its preferred embodiment, other modifications may be made. For example, the various ratios of secondary winding length to height, to width, and to area may be decreased 10 to 15 percent and still result in a ballast which has a relatively long life. Likewise, the current densities in the primary and secondary windings may be increased 10 to 15 percent and still result in a ballast which has a relatively long life. It is not necessary in all applications that the case or housing 10 house a capacitor or capacitors, and it is also not necessary that only three heater windings be provided. More or less heater windings may be provided, but it is preferable that the primary winding A have generally the same cross sectional configuration as the secondary winding D. Thus, it is to be understood that modifications may be made without departing from the spirit of the invention or from the scope of the claims.

What I claim as new and desire to secure by Letters Patent of the United States is:

1. An improved ballast for at least one fluorescent lamp comprising: an elongated, shell-type magnetic core having a center leg positioned along a longitudinal axis and having first and second side legs positioned on opposite sides of said center leg to form first and second winding openings between said center leg and said first and second side legs respectively; said first and second winding openings each having a configuration in a plane transverse to said longitudinal axis of a width that is substantially equal to one-half the width of said center leg in said plane; a secondary winding precision wound about one portion of said center leg in said winding openings and having a total length along said longitudinal axis that is approximately eight times said winding opening width; a primary winding wound about another portion of said center leg in said winding openings; and said primary and secondary windings each having predetermined cross sectional areas sufficient to provide current densities less than 1100 amperes per square inch during normal operation.

2. An improved ballast for at least one fluorescent lamp comprising: an elongated, shell-type magnetic core formed of laminations stacked to a predetermined height, said core comprising: a center leg positioned along a longitudinal axis and having substantially similar first and second side legs positioned on opposite sides of said center leg to form first and second winding openings between said center leg and said first and second side legs respectively; said first and second winding openings each having a cross section in a plane transverse to said longitudinal axis that has a height that is substantially equal to said predetermined height and that has a width that is at least as small as one-half the width of said center leg; said first and second side legs each having a width that is substantially equal to said width of one of said winding openings; a secondary winding of low resistance wire having a cross sectional area to provide during operation a current density below 1100 amperes per square inch precision wound about one portion of said center leg in said winding openings and having a total length along said longitudinal axis that is approximately eight times said width of one of said winding openings; and a primary winding of low resistance wire having a cross sectional area to provide during operation a current density below 1100 amperes per square inch wound about another portion of said center leg in said winding openings.

3. An improved ballast for an electric discharge lamp comprising: an elongated core having a center leg and first and second side legs on opposite sides of said center leg, said first and second side legs being joined at each end to said central leg to form first and second winding openings between said center leg and said first and second side legs respectively; a secondary winding precision wound transversely around a first portion of said center leg and positioned in said first and second winding openings, said secondary winding having a total length along said center leg that is at least 1.5 times the larger transverse dimension of said secondary winding; a primary winding wound transversely around a second portion of said center leg and positioned in said first and second winding openings; and said primary and secondary windings having respective predetermined cross sectional areas sufficient to provide respective current densities below 1100 amperes per square inch during normal operation.

4. An improved ballast for an electric discharge lamp comprising: an elongated core having a center leg and first and second side legs on opposite sides of said center leg, said first and second side legs being joined at each end to said center leg to form first and second winding openings between said center leg and said first and second side legs respectively; a secondary winding precision wound transversely around a first portion of said center leg and positioned in said first and second winding openings, said secondary winding having a total length along said center leg that is at least 1.9 times the smaller transverse dimension of said secondary windings; a primary winding wound transversely around a second portion of said center leg and positioned in said first and second winding openings; and said primary and secondary windings having respective predetermined cross sectional areas sufficient to provide respective current densities below 1100 amperes per square inch during normal operation.

5. An improved ballast for an electric discharge lamp comprising: an elongated core of the shell-type having an inner leg and first and second side legs on opposite sides of said center leg, said first and second side legs being joined at each end to said inner leg to form first and second winding openings between said inner leg and said first and second side legs respectively; a secondary winding of low electrical resistance and having a cross sectional area to provide during normal operation a current density therein below 1100 amperes per square inch precision wound transversely around a first portion of said inner leg and positioned in said first and second winding openings, said secondary winding having a total length along said inner leg that is approximately 1.7 times the larger transverse dimension of said secondary winding and that is approximately 2.1 times the smaller transverse dimension of said secondary winding; and a primary winding of low electrical resistance and having a cross sectional area to provide during normal operation a current density therein below 1100 amperes per square inch wound transversely around a second portion of said inner leg and positioned in said first and second winding openings.

6. An improved ballast for an electric discharge lamp comprising: an elongated core of the shell-type having a central leg and first and second side legs on opposite sides of said central leg, said first and second side legs being joined at each end to the end of said central leg to form first and second winding openings between said central leg and said first and second side legs respectively; a secondary winding having a predetermined cross sectional area sufficient to carry its normal oprating current at a density of approximately 1000 amperes per square inch precision wound transversely around a first portion of said central leg and positioned in said first and second winding openings, said secondary winding having a total length along said central leg that is at least 1.5 times the larger transverse dimension of said secondary winding and that is at least 1.9 times the smaller transverse dimension of said secondary winding; and a primary winding having a predetermined cross sectional area sufficient to carry its normal operating current at a density of approximately 1000 amperes per square inch wound transversely around a second portion of said central leg and positioned in said first and second winding openings, said primary winding having substantially the same transverse dimensions as said secondary winding.

7. The ballast defined in claim 6 and further comprising: a housing for said core and windings; and means for mounting said core and windings in said housing.

8. The ballast defined in claim 6 and further comprising: at least one capacitor connected to said secondary winding.

9. The ballast defined in claim 6 and further comprising a capacitor having at least two terminals; means coupling at least one of said terminals to said secondary winding; an elongated case; said core, said windings, and said capacitor being positioned end to end in said case; a filler holding said core, said windings, and said capacitor in fixed relation in said case; and leads coupled to said windings and to said capacitor, said leads being brought out of said case for external connection.

References Cited

UNITED STATES PATENTS

| | | | |
|---|---|---|---|
| 2,971,124 | 2/1961 | Feinberg et al. | 336—160 X |
| 3,107,317 | 10/1963 | Ouletta | 336—165 X |
| 3,111,637 | 11/1963 | Ouletta | 336—165 |
| 3,125,705 | 3/1965 | Feinberg et al. | 336—165 X |
| 3,201,646 | 8/1965 | Mansfield | 200—135 X |
| 3,217,278 | 11/1965 | Beckes et al. | 336—210 |

LEWIS H. MYERS, *Primary Examiner.*

T. J. KOZMA, *Assistant Examiner.*